(12) United States Patent
Schütz et al.

(10) Patent No.: US 11,945,580 B2
(45) Date of Patent: Apr. 2, 2024

(54) VEHICLE CLEANING SENSORS

(71) Applicant: Volkswagen Aktiengesellschaft, Wolfsburg (DE)

(72) Inventors: Daniel Schütz, Lehre (DE); Stephan Herold, Braunschweig (DE); Kristin Fondahl, Braunschweig (DE); Micha Helbig, Braunschweig (DE)

(*) Notice: Subject to any disclaimer, the term of this patent is extended or adjusted under 35 U.S.C. 154(b) by 702 days.

(21) Appl. No.: 17/050,404

(22) PCT Filed: Apr. 23, 2019

(86) PCT No.: PCT/EP2019/060264
§ 371 (c)(1),
(2) Date: Oct. 23, 2020

(87) PCT Pub. No.: WO2019/206849
PCT Pub. Date: Oct. 31, 2019

(65) Prior Publication Data
US 2021/0053678 A1  Feb. 25, 2021

(30) Foreign Application Priority Data
Apr. 26, 2018 (DE) .................. 102018206520.9

(51) Int. Cl.
*B64C 39/02* (2023.01)
*B25J 11/00* (2006.01)
(Continued)

(52) U.S. Cl.
CPC ......... *B64C 39/024* (2013.01); *B25J 11/0085* (2013.01); *B60S 1/56* (2013.01);
(Continued)

(58) Field of Classification Search
CPC .... B64C 39/024; B64C 39/02; B25J 11/0085; B60S 1/56; B60S 3/04; B64U 30/20; B64U 2101/30; B64U 2201/20; B08B 5/00
See application file for complete search history.

(56) References Cited

U.S. PATENT DOCUMENTS 10,046,857 B2   8/2018 Azaiz
10,457,253 B2  10/2019 Trebouet et al.
(Continued)

FOREIGN PATENT DOCUMENTS

CN    106537274 A   3/2017
CN    106809175 A   6/2017
(Continued)

OTHER PUBLICATIONS

PCT/EP2019/060264. Int'l Search Report (dated Jul. 11, 2019).
Corresponding CN Application No. 201980028336.X. Office Action (dated Dec. 6, 2023).

*Primary Examiner* — Shon G Foley
(74) *Attorney, Agent, or Firm* — Peter Zura; LOZA & LOZA, LLP

(57) ABSTRACT

Cleaning vehicle sensors, wherein position data of a vehicle are received (1). An unmanned aircraft suitable for cleaning vehicle sensors flies to the vehicle on the basis of the received position data of the vehicle, positions itself, on the basis of location data of a sensor of the vehicle that is to be cleaned, near the vehicle in such a way that the sensor to be cleaned can be cleaned, and cleans the sensor. The vehicle can transmit the position data of the vehicle to a Service Station via a mobile data connection, wherein the Service Station causes the unmanned aircraft to fly to the vehicle and, after the end of the cleaning operation, to return to the Service Station.

14 Claims, 3 Drawing Sheets

(51) Int. Cl.
  *B60S 1/56* (2006.01)
  *B60S 3/04* (2006.01)
  *B64U 30/20* (2023.01)
  *B64U 101/30* (2023.01)

(52) U.S. Cl.
  CPC .............. *B60S 3/04* (2013.01); *B64U 30/20* (2023.01); *B64U 2101/30* (2023.01); *B64U 2201/20* (2023.01)

(56) References Cited

U.S. PATENT DOCUMENTS

| | | |
|---|---|---|
| 2015/0090291 A1 | 4/2015 | Na et al. |
| 2015/0213318 A1 | 7/2015 | Einecke |
| 2016/0282874 A1* | 9/2016 | Kurata ................. G05D 1/0289 |
| 2017/0121019 A1* | 5/2017 | Shin ....................... B08B 1/006 |
| 2017/0129099 A1 | 5/2017 | Alduaiji et al. |
| 2017/0129602 A1 | 5/2017 | Alduaiji et al. |
| 2018/0061148 A1 | 3/2018 | Dudar et al. |
| 2019/0009908 A1* | 1/2019 | Perez Barrera .......... B64D 1/18 |
| 2019/0055015 A1* | 2/2019 | Allard ................... B64C 39/024 |

FOREIGN PATENT DOCUMENTS

| | | |
|---|---|---|
| CN | 107792049 A | 3/2018 |
| DE | 10332939 A1 | 2/2005 |
| DE | 102011012837 A1 | 9/2012 |
| DE | 102014200097 A1 | 7/2015 |
| DE | 102014009903 A1 | 1/2016 |
| DE | 102014116821 A1 | 5/2016 |
| DE | 102014226358 A1 | 6/2016 |
| DE | 102015010152 A1 | 2/2017 |
| DE | 102018115966 A1 | 1/2019 |
| EP | 2899692 A1 | 7/2015 |
| GB | 2552092 A | 1/2018 |
| WO | 2013076711 A1 | 5/2013 |

* cited by examiner

VEHICLE CLEANING SENSORS

RELATED APPLICATIONS

The present application claims priority to International Patent App. No. PCT/EP2019/060264 to Daniel Schütz et al., filed Apr. 23, 2019, which further claims priority to German Pat. App. No. DE 102018206520.9 filed Apr. 26, 2018, each the contents being incorporated by reference in their entirety herein.

BACKGROUND

The present disclosure relates to cleaning vehicle sensors, in particular for cleaning vehicle sensors in an autonomously driven vehicle. The present disclosure also relates to an unmanned vehicle utilizing such technologies.

Numerous sensors are incorporated in today's vehicles. As such, a continuous monitoring of a vehicle's environment by sensors takes place with driver assistance systems that helps the driver drive the vehicle and warns of potential upcoming hazards. Sensor based detection of the vehicle's environment is of even greater importance with autonomously driven vehicles, because automatic driving of a self-driving vehicle is only possible when the driving lane and potential obstacles are detected. Various types of sensors, based on different technologies, can be used for environment detection, wherein a particularly reliable image of the environment is frequently generated by a combination of data from different sensors, for example, through so-called sensor fusion. In addition to radar and ultrasonic sensors, in particular sensors for optically recording the environment are used.

It is necessary, in particular for autonomous vehicles, that the sensor-based detection of the vehicle's environment functions properly. This is one way to ensure, for example, that obstacles will be detected early enough that it is possible to react appropriately. When sensors become dirty, in particular with optical processes such as LIDAR, it may be the case that the vehicle's environment can no longer be correctly detected, such that the vehicle cannot continue to travel without posing a hazard.

In this case, the sensor must be cleaned before it is possible to safely continue. For this, a passenger may be required to get out of the stopped car and clean the sensor. If an autonomous vehicle is driving without passengers, the vehicle needs special assistance, as there are no passengers who can get out of the vehicle to remove the dirt. The vehicle could also drive to a washing facility, if the dirt has been detected early enough, and the amount of dirt still allows for this.

Automatic cleaning systems for the various sensors could also be permanently installed in the vehicle, which would require that all of the safety-relevant sensors be equipped with such cleaning systems. This would increase the production costs for the vehicle, and would also require additional installation space for the cleaning system.

In particular, when the sensors rarely become extremely dirty, it would less expensive over the course of the service life of the vehicle to contract a service provider to manually remove the dirt than to use automatic cleaning systems when the sensors become dirty. This service provider would then drive to the vehicle in question when it is necessary to clean the dirtied sensor. This could require a great deal of time, depending on the distance, route, and traffic. The vehicle is then unable to continue during this time, which could lead to difficulties if delivery deadlines must be met.

For stationary objects such as buildings, unmanned aircraft can be used for cleaning purposes. As such, a method for controlling an aircraft for cleaning glass facades or the surfaces of solar modules in a solar power plant is known from DE 10 2014 009 904 A1. The surfaces can be cleaned with a cleaning apparatus on the aircraft, e.g. a brush or an airflow caused by a rotor, wherein the cleaning apparatus can be controlled independently of the aircraft. The method comprises detecting the surface of the object that is to be cleaned, aligns the aircraft therewith, and structures the flight path. As a result, the surface can be particularly efficiently cleaned.

DE 10 2014 116 821 A1 also describes an unmanned helicopter that can be used for processing a surface, e.g. a building wall. The unmanned helicopter has a connecting region for a hose for a pump load retained in a reservoir on the outside of the helicopter, and a device that makes use of this load. By way of example, the load can be applied to a surface in the environment of the aircraft, or it can be sprayed into the air from the aircraft. The device can be in the form of a brush or roller, or a nozzle for applying paint to building facades, or in the form of a sandblaster for cleaning building facades, or it can take the form of a window cleaning device.

Lastly, WO 2013/07671 1 A2 discloses a remote-controlled mini-helicopter that contains cleaning brushes for cleaning glass on the facades of taller buildings, which move up and down on the glass that is to be cleaned for this purpose. The mini-helicopters are connected to safety lines mounted on the roof and to a truck during the cleaning process. The truck supplies the mini-helicopter with cleaning fluids and has a control panel in its cab for monitoring and controlling the cleaning process.

The object of the present disclosure is to create an improved method for cleaning vehicle sensors, in particular for cleaning vehicle sensors in autonomous vehicles.

BRIEF SUMMARY

In some examples, position data for a vehicle are received for cleaning vehicle sensors. An unmanned vehicle, such as an aircraft suitable for cleaning vehicle sensors may fly in proximity to the vehicle to clean the dirty sensor on the basis of the received position data, and cleans the sensor.

Although unmanned aircraft have not been used until recently for cleaning stationary objects, according to the present disclosure, a vehicle sensor can also be cleaned by an unmanned aircraft when the position data for the vehicle and the location data for the sensor that is to be cleaned are known and used. Because the unmanned aircraft can travel directly to the vehicle, independently of traffic lights and traffic, it can reach the vehicle quickly, such that a dirtied sensor can be cleaned quickly, and the vehicle can continue on its way. As a result, there is no need to equip the vehicle with additional cleaning systems, thus avoiding the aforementioned disadvantages.

In some examples, the vehicle may transmit its position data to a service station via a mobile data connection. The service station receives this data, and then sends an unmanned aircraft to the vehicle. After completing the cleaning procedure, the unmanned aircraft then returns to the service station.

Numerous unmanned aircraft can be stored at such a service station, such that even when covering a large geographic region it can be ensured that all the vehicles in need of sensor cleaning can be reached, even when numerous requests arrive simultaneously.

In some examples, the dirt on the sensors may be detected by the vehicle. This allows for an immediate reaction to the dirt, and a targeted cleaning of the dirty sensor to be requested when it poses a risk for further travel.

An autonomous vehicle can thus be advantageously stopped automatically, if safe driving is no longer ensured due to the dirtying of the sensor.

In this manner, a hazard to the vehicle or other road users can be avoided if a passenger in the autonomous vehicle does not react to the request for cleaning the sensor, or the vehicle is unoccupied.

The vehicle can likewise send information regarding the dirtied sensor to the service station via the mobile data connection. This allows the service station to assess the urgency of the cleaning, for example, or to select the appropriate aircraft for cleaning the dirty sensor, if the various unmanned aircraft are designed for different tasks.

Furthermore, the vehicle may send information regarding the vehicle model and/or the location data for the sensor that is to be cleaned in a coordinate system for the vehicle model to the service station via the mobile data connection, and the service station can send the information regarding the vehicle model and/or the location data, or data derived therefrom, to the unmanned aircraft. Because the sensors in various vehicle models are at different locations in the vehicle body, this information simplifies finding the sensor that is to be cleaned for the aircraft, such that it can position itself appropriately for the cleaning procedure.

BRIEF DESCRIPTION OF THE DRAWINGS

Further features of the present disclosure shall become apparent from the following description and the claims, in conjunction with the drawings. Therein:

DETAILED DESCRIPTION

Figure 1:
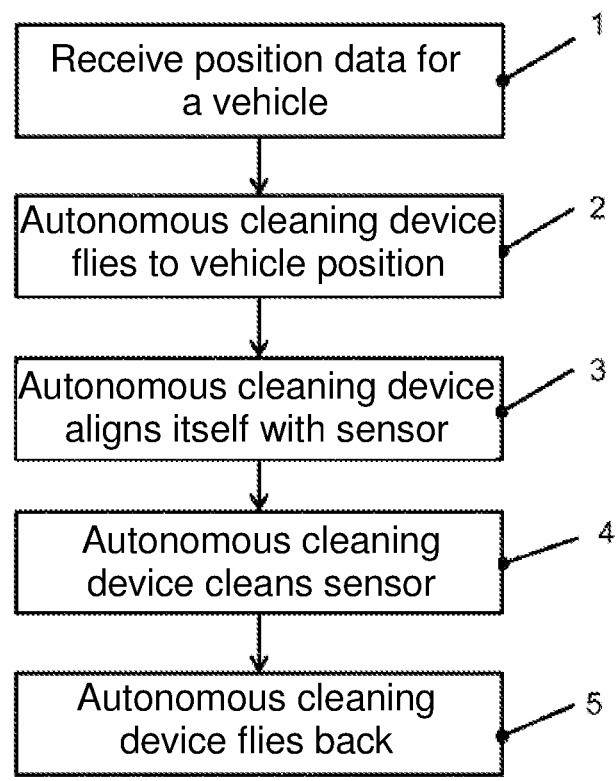
FIG. 1 shows a schematic illustration of a method according to one example for cleaning vehicle sensors with an unmanned aircraft.

In some examples, an unmanned aircraft is disclosed for cleaning vehicle sensors, wherein the unmanned aircraft may comprise a drive unit with numerous motorized rotors, which lift and/or propel the unmanned aircraft; a navigator for navigating to a vehicle on the basis of the position data for the vehicle and to navigate on the vehicle on the basis of the location data for a sensor that needs to be cleaned on the vehicle; a control unit that controls the drive unit on the basis of the navigation data from the navigator, such that the unmanned aircraft flies to the vehicle and can position itself close enough to the vehicle to be able to clean the sensor; and a cleaning unit that is suitable for cleaning the sensor in question.

The unmanned aircraft may be configured with a camera unit and an evaluation unit, wherein the evaluation unit determines the position of a sensor that is to be cleaned, which has been optically detected by the camera unit, in relation to the unmanned aircraft. This allows the cleaning unit to be positioned as precisely as possible in front of the sensor that is to be cleaned.

In some examples, the cleaning unit has a pressurized air tank, which is connected to an electronically controlled valve with a downstream pressure reducer and pressurized air cleaning device.

Because cleaning takes place without contact, the unmanned aircraft may be navigated comparatively easily, even under poor weather conditions, e.g. strong or gusting winds.

In this case, the cleaning unit may be configured with a fluid tank for cleaning fluid, wherein the cleaning fluid is mixed with the pressurized air, such that the surface that is to be cleaned is sprayed with a mixture of air and liquid.

By using a cleaning fluid, the cleaning effects can be significantly increased, in particular in the case of dirt strongly adhering to the surface.

In some examples, the cleaning unit can be lowered on a cable with a winch, or using a telescoping rod, in order to position the cleaning unit in front of the sensor that is to be cleaned.

In some examples, because the cleaning unit is not rigidly connected to the unmanned aircraft, it can fly over the vehicle, and simply lower the cleaning apparatus, which may be advantageous in tight spaces.

In some examples, a cleaning unit is disclosed that comprises one or more motorized cleaning brushes, which are rotated in order to clean the sensor that is to be cleaned; a cleaning fluid tank; a nozzle with which the cleaning fluid is sprayed on the sensor that is to be cleaned; a pump that removes cleaning fluid from the cleaning fluid tank and supplies it to the nozzle; and a motor driven propeller, placed such that the cleaning brushes are pressed against the sensor that is to be cleaned.

For a better understanding of the principles of the present disclosure, various examples are explained herein with reference to the drawings. It is to be understood that the present disclosure is not limited to these embodiments, and that the features described herein can also be combined or modified without abandoning the scope of protection for the disclosure as it is defined in the claims.

FIG. 1 shows a schematic illustration of a flow chart for a method according to the present disclosure. First, the position of the vehicle on which a cleaning of the sensor is to be carried out is determined. This can take place, e.g. using a GPS receiver in a navigation system in the vehicle. The vehicle transmits the current position data for the vehicle via a mobile data connection to a service station, which operates at least one unmanned aircraft, preferably numerous such aircraft, for cleaning vehicle sensors. Such a service station can be operated, e.g., by the vehicle manufacture itself, garages for motor vehicles, or service providers specializing in cleaning vehicle sensors.

The unmanned aircraft can be a so-called multicopter that has numerous motorized rotors, e.g. a tricopter (with three motors), quadcopter (with four motors), hexacopter (with six motors) or octocopter (with eight motors), which has a cleaning unit, described below, for cleaning the vehicle sensors.

The position data for the vehicle are then received by the unmanned aircraft via the service station in step 1. It is also possible to send the position data for the vehicle directly to an unmanned aircraft in the immediate proximity of the vehicle via the mobile data connection, and for the unmanned aircraft to receive this data.

The service station may send an unmanned aircraft to the vehicle to clean the sensors, which then flies in step 2 to where the vehicle is located. The unmanned aircraft may be at the service station, and loaded there, and potentially provided with cleaning fluid, or it may already be underway, e.g. while returning from a previous cleaning of sensors on another vehicle. The service station can select an appropriate unmanned aircraft from those available on the basis of various criteria. If, for example, there is information indicating which vehicle sensor needs cleaning, an aircraft can be sent out that has a cleaning unit particularly suited to this vehicle sensor. If the cleaning is particularly urgent, an unmanned aircraft can be selected that can get to the relevant vehicle particularly quickly. It is also possible to send the closest unmanned aircraft to this vehicle, which may already be in flight, in order to reduce costs.

If it can be assumed that the vehicle has not moved since the initial transmission of the position data, e.g. because the vehicle was already stopped on the side of the road when transmitting the position data, in order to wait for the cleaning, the position of the vehicle that the unmanned aircraft will fly to corresponds to the original position data for the vehicle. The flight path for the unmanned aircraft is then determined for this vehicle position by either the service station or the unmanned aircraft itself.

It may be possible for the vehicle to have moved since the initial transmission of the position data. In this case, the vehicle can transmit its current position at regular intervals, for example, such that the flight path of the unmanned aircraft can be adjusted. It can also be the case that data for a preprogrammed route are transmitted with the initial transmission of the position data by a navigator in the vehicle, and used to estimate future position data. As a result, the unmanned aircraft can take the pre-programmed route to the destination, for example, in order to carry out the cleaning procedure there. It is also possible to determine an earliest possible meeting point based on the routes and the anticipated speeds of the vehicle and the unmanned aircraft.

After the unmanned aircraft reaches the vehicle, it may align itself with the vehicle sensor that is to be cleaned in step 3. Location data regarding the sensor that is to be cleaned that have been sent to the unmanned aircraft by the service station or the vehicle, or which can be stored directly in a memory in the unmanned aircraft can be evaluated for this. The vehicle sensors can also be detected by one or more sensors on the unmanned aircraft. The precise location of the sensor that is to be cleaned can therefore be determined, e.g., with a camera and a suitable image recognition algorithm. People, buildings, or other air traffic in the vicinity can also be detected in order to avoid collisions. A separate camera can also be used for this.

The cleaning of the vehicle sensor with the cleaning unit in the unmanned aircraft then takes place in step 4, where it is ensured that the relative position of the unmanned aircraft to the vehicle is maintained during the cleaning process. The cleaning can take place for a predefined time period that has proven to be sufficient for cleaning the respective vehicle sensor. It is also possible to check the cleaning progress, e.g. optically, by means of the aforementioned camera.

After completion of the cleaning process, the unmanned aircraft then preferably returns to the service station in step 5 to reload so that is can be available for new cleaning tasks. The unmanned aircraft may also first fly to another vehicle that needs sensors cleaned, before it returns to the service station.

Both the flight to the vehicle and the cleaning of the sensors can take place autonomously with the unmanned aircraft, and this can be monitored and controlled by the service station, in particular in difficult conditions during the flight or cleaning phases.

In addition to cleaning a dirty vehicle sensor, which may take place as quickly as possible, it is also conceivable to clean sensors that become dirty over the course of time at regular service intervals, independently of detected dirtying.

Figure 2:
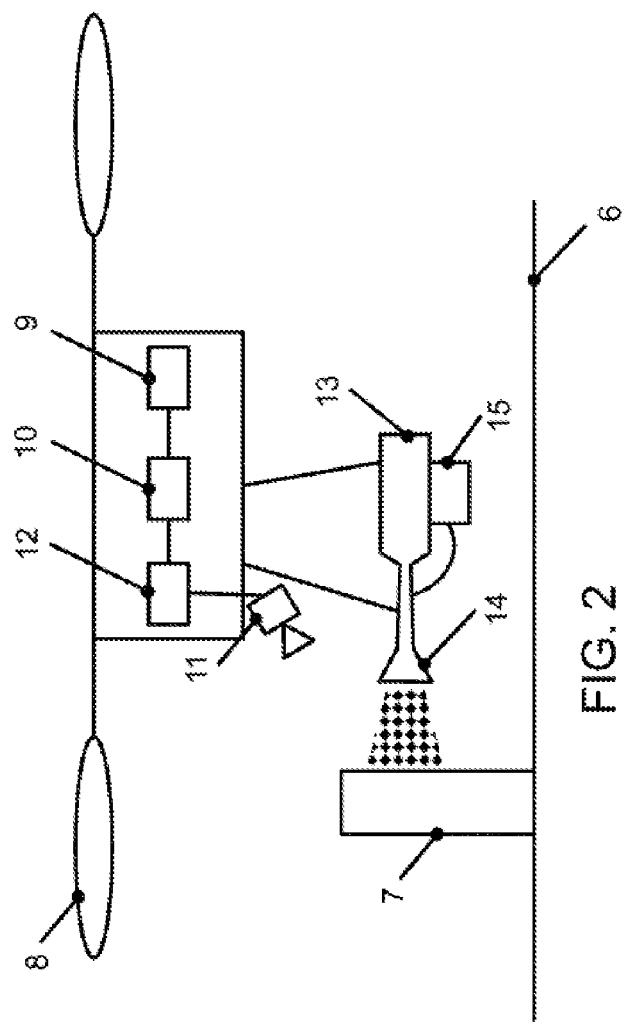
FIG. 2 shows a schematic illustration of an unmanned aircraft according to an example.

An example of an unmanned aircraft according to the present disclosure is shown schematically in FIG. 2. The unmanned aircraft is located above the schematically indicated vehicle roof 6 in front of a sensor 7 on the vehicle, e.g. a lidar sensor mounted on the roof.

The unmanned aircraft may be configured with a drive unit having a number of motorized rotors 8 that lift and/or propel the unmanned aircraft. There is also a navigator 9 for navigating to the vehicle on the basis of the position data for the vehicle, and to navigate on the vehicle on the basis of the location data for the sensor that is to be cleaned. A control unit 10 may control the drive unit on the basis of navigation data from the navigator 9, such that the unmanned aircraft flies to the vehicle and can position itself close enough to the vehicle to clean the sensor 7 that is to be cleaned. A camera unit 11 may be configured for optically detecting the sensor that is to be cleaned in order to obtain a precisely targeted position during the cleaning procedure. The image data generated by the camera unit 11 may be sent to an evaluation unit 12 for this, which determines the precise position of the sensor that is to be cleaned by means of an image recognition algorithm, and sends data in this regard to the control unit 10.

The actual cleaning unit for cleaning the sensor may be configured with the following design in this example. A pressurized air tank 13 may be filled with pressurized air. The pressurized air tank 13 can be removable, such that an empty pressurized air tank can be quickly removed and replaced with a previously filled pressurized air tank when the unmanned aircraft has landed at the service station, or it can be permanently attached to the unmanned aircraft.

The pressurized air tank 13 may be connected to an electronically controlled valve, with a downstream pressure reducer and pressurized air cleaning device. When the valve is actuated, the air then flows through a nozzle 14. Cleaning fluid is also drawn from a tank for the cleaning fluid 15, such that the surface that is to be cleaned can be sprayed with a mixture of cleaning fluid and air. The position of the nozzle can be adjusted or altered during the cleaning procedure using adjustment mechanisms, e.g. servomotors provided for this.

Figure 3:
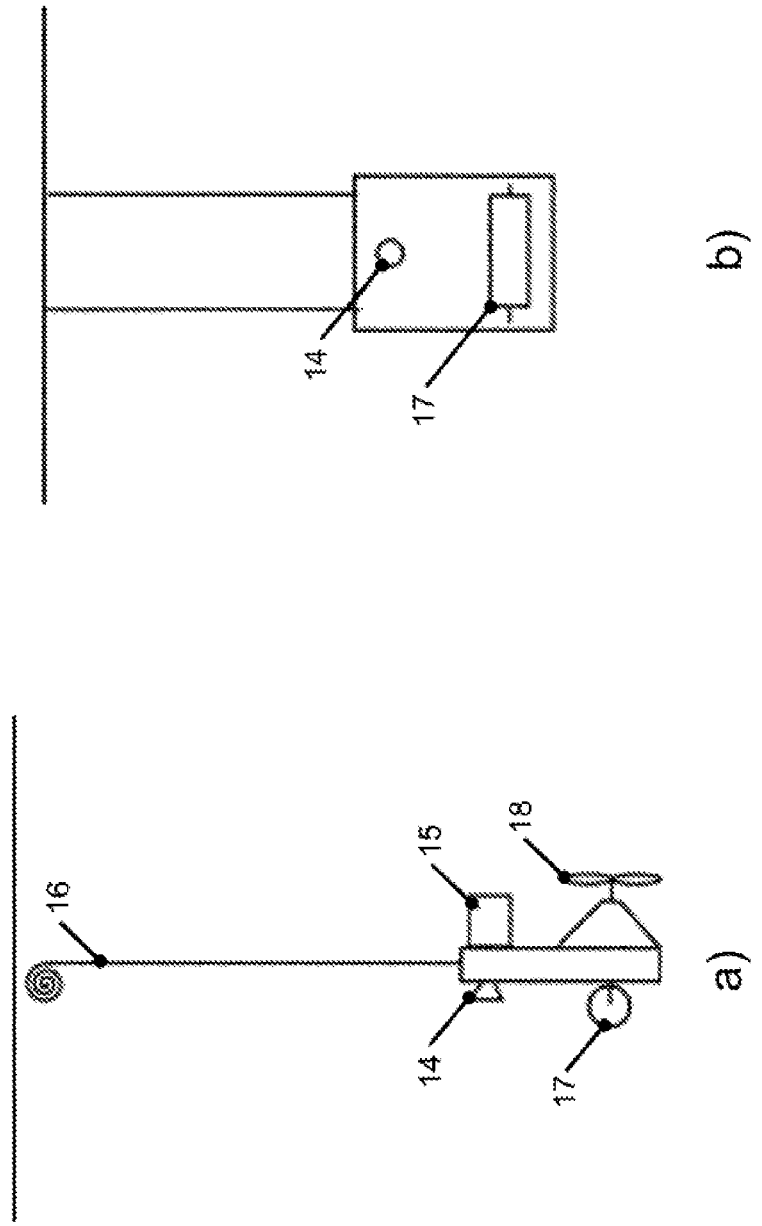
FIG. 3 shows a schematic illustration of a side view (a) and top view (b) of an unmanned aircraft according to an example.

A cleaning unit of another example of the unmanned aircraft according to the present disclosure is shown schematically in FIG. 3. The cleaning unit can be lowered from the unmanned aircraft for the cleaning procedure on a cable with a winch 16, or using a telescoping rod, and thus positioned in front of the sensor that is to be cleaned. There are one or more brushes 17 for the cleaning, which are rotated by motors. A tank 15 may be configured for holding cleaning fluid. The cleaning fluid is sprayed through a nozzle 14 by a pump onto the sensor that is to be cleaned. The brushes 17 then rotate on the location that is to be cleaned, wherein they are pressed against this surface by one or more motorized propellers 18. After the cleaning procedure, the cleaning unit is returned to the starting position for further flight or the return flight to the service station, such that it does not form an obstruction.

LIST OF REFERENCE SYMBOLS

1 step 1, in which position data for a vehicle are received
2 step 2, in which the unmanned aircraft flies to the vehicle position 3 step 3, in which the unmanned aircraft aligns itself with the a sensor
4 step 4, in which the unmanned aircraft cleans the sensor
5 step 5, in which the unmanned aircraft returns to the service station
6 vehicle roof
7 vehicle sensor
8 rotor
9 navigator
10 control unit
11 camera unit
12 evaluation unit
13 pressurized air tank
14 nozzle
15 cleaning fluid tank
16 cable winch
17 brush
18 motorized propeller for generating pressure

The invention claimed is:

1. A method for cleaning vehicle sensors, comprising:
receiving, at a service station, position data for a vehicle via a mobile data connection;
receiving, at the service station, sensor data for the vehicle via the mobile data connection, wherein the sensor data comprises data indicating a type of sensor and/or the urgency of the cleaning required;
selecting, at the service station, an unmanned vehicle from the service station, based on the received sensor data;
causing the selected unmanned aircraft to fly to the vehicle on the basis of the position data received for the vehicle;
positioning the unmanned aircraft in proximity to the vehicle to clean a predetermined sensor based on the sensor data and location data; and
causing the unmanned aircraft to perform a cleaning operation on the predetermined sensor; and
causing the unmanned aircraft to return to the service station after the cleaning operation is completed.

2. The method according to claim 1, further comprising receiving a signal from the vehicle indicating the predetermined sensor that the unmanned aircraft is to position over for the cleaning operation.

3. The method according to claim 1, further comprising transmitting a signal from the service station to stop the vehicle when a level of dirtying of the sensor exceeds a predetermined amount.

4. The method according to claim 1, further comprising receiving information regarding at least one of a vehicle model and/or location data for the sensor that is to be cleaned in a coordinate system for the vehicle, and transmitting the received information to the unmanned aircraft.

5. An unmanned aircraft for cleaning vehicle sensors, comprising
a drive unit comprising a number of motorized rotors configured to lift and propel the unmanned aircraft;
a navigator for navigating to a vehicle on the basis of position data for the vehicle and the location data for a sensor on the vehicle identified for cleaning;
a cleaning unit for cleaning the sensor;
a camera unit for optically detecting one or more of the vehicle sensors;
an evaluation unit configured to determine the position of the sensor that is to be cleaned in relation to the unmanned aircraft, via optical detection by the camera unit, the evaluation unit being further configured to receive sensor data for the vehicle received via a service station, wherein the sensor data comprises data indicating a type of sensor and/or the urgency of the cleaning required; and
a control unit for activating the unmanned aircraft based on a selection by the service station based on the sensor data, the control unit being further configured to control the drive unit on the basis of navigation data from the navigator, such that the unmanned aircraft flies to the vehicle and position itself in proximity to the vehicle to perform a cleaning operation via the cleaning unit, and return to the service station after the cleaning operation is completed.

6. The unmanned aircraft according to claim 5, wherein the cleaning unit comprises a pressurized air tank operatively coupled to an electronically controlled valve and a downstream pressure reducer and pressurized air cleaning device.

7. The unmanned aircraft according to claim 6, wherein the cleaning unit comprises a cleaning fluid tank, for mixing cleaning fluid with pressurized air, such that the surface that is to be cleaned is sprayed with a mixture of air and liquid.

8. The unmanned aircraft according to claim 5, wherein the cleaning unit is configured to be lowered via one of a cable with a winch or a telescoping rod, in order to position the cleaning unit in front of the sensor that is to be cleaned.

9. The unmanned aircraft according to claim 5, wherein the cleaning unit comprises:
one or more motorized cleaning brushes, configured to be rotated in order to clean the sensor;
a cleaning fluid tank;
a nozzle for spraying cleaning fluid;
a pump configured to propel cleaning fluid from the cleaning fluid tank to the nozzle; and
a motor driven propeller, for pressing the cleaning brushes against the sensor.

10. A method for operating an unmanned aircraft for cleaning vehicle sensors, comprising
receiving, at a service station, position data for the vehicle and location data for a sensor on the vehicle identified for cleaning;
receiving, at the service station, sensor data for the vehicle, wherein the sensor data comprises data indicating a type of sensor and/or the urgency of the cleaning required;
determining, at the service station, the position of the sensor that is to be cleaned in relation to the unmanned aircraft;
selecting an unmanned vehicle from the service station, based on the received sensor data;
causing the selected unmanned aircraft to fly to the vehicle on the basis of the position data received for the vehicle;
positioning the unmanned aircraft in proximity to the vehicle to clean a predetermined sensor based on the sensor data and location data; and
causing the unmanned aircraft to perform a cleaning operation via a cleaning unit on the predetermined sensor based on part on optical detection; and
causing the unmanned aircraft to return to the service station after the cleaning operation is completed.

11. The method according to claim 10, wherein the cleaning unit comprises a pressurized air tank operatively coupled to an electronically controlled valve and a downstream pressure reducer and pressurized air cleaning device.

12. The method according to claim 11, further comprising mixing cleaning fluid with pressurized air via a cleaning fluid tank of the cleaning unit, such that the surface that is to be cleaned is sprayed with a mixture of air and liquid.

13. The method according to claim 10, further comprising lowering, via one of a cable with a winch or a telescoping rod, the cleaning unit in order to position the cleaning unit in front of the sensor prior to causing the unmanned aircraft to perform the cleaning operation.

14. The method according to claim 10, wherein the cleaning unit comprises:
- one or more motorized cleaning brushes, configured to be rotated in order to clean the sensor;
- a cleaning fluid tank;
- a nozzle for spraying cleaning fluid;
- a pump configured to propel cleaning fluid from the cleaning fluid tank to the nozzle; and
- a motor driven propeller, for pressing the cleaning brushes against the sensor.

* * * * *